(No Model.) 2 Sheets—Sheet 1.

T. R. ALMOND.
CHUCK.

No. 594,587. Patented Nov. 30, 1897.

WITNESSES:
Gustave Dieterich
Geo. E. Morse

INVENTOR
Thomas R. Almond
BY Briesen & Knauth
ATTORNEYS (No Model.) 2 Sheets—Sheet 2.
T. R. ALMOND.
CHUCK.
No. 594,587. Patented Nov. 30, 1897.
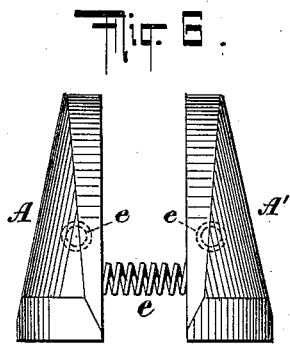
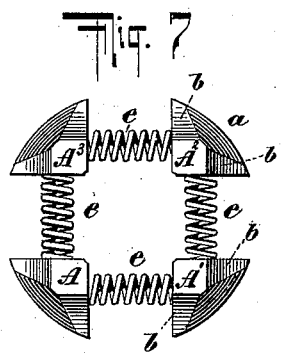
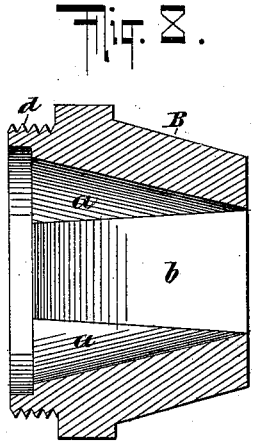
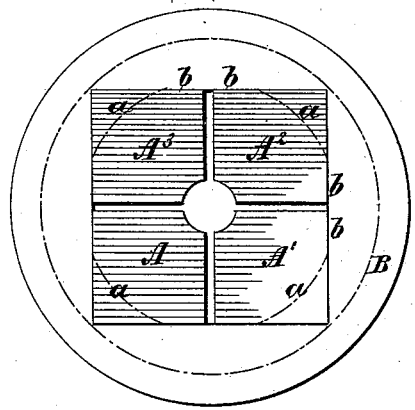
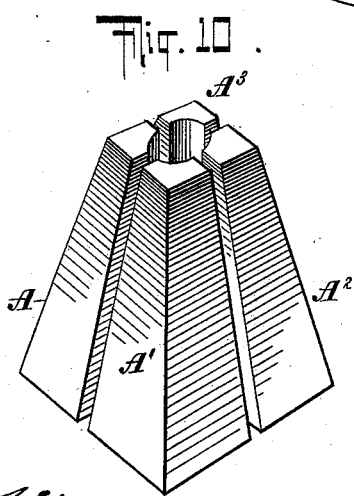
WITNESSES:
Gustave Dieterich
INVENTOR
Thomas R Almond
BY Briesen Knauth
ATTORNEYS

UNITED STATES PATENT OFFICE.

THOMAS R. ALMOND, OF DUNWOODIE HEIGHTS, NEW YORK.

CHUCK.

SPECIFICATION forming part of Letters Patent No. 594,587, dated November 30, 1897.

Application filed September 4, 1897. Serial No. 650,568. (No model.)

*To all whom it may concern:*

Be it known that I, THOMAS R. ALMOND, a resident of Dunwoodie Heights, Westchester county, State of New York, have invented an Improved Chuck, of which the following is a specification.

The object of this invention is to produce a chuck or gripping-tool which is capable of containing four or more movable jaws and in which the motion of the jaws and their gripping action are attained by the simplest possible means, the entire device being based upon exact scientific principles.

The chuck of the invention may in a crude way be described as composed of an inner pyramidal-like structure, which forms the jaws, and of an embracing contractor-shell, whose inner faces conform to the outer faces of the jaws, so that this contractor-shell by its angles will form the guideways for the jaws and by its slope will form the contracting means.

Figure 1:
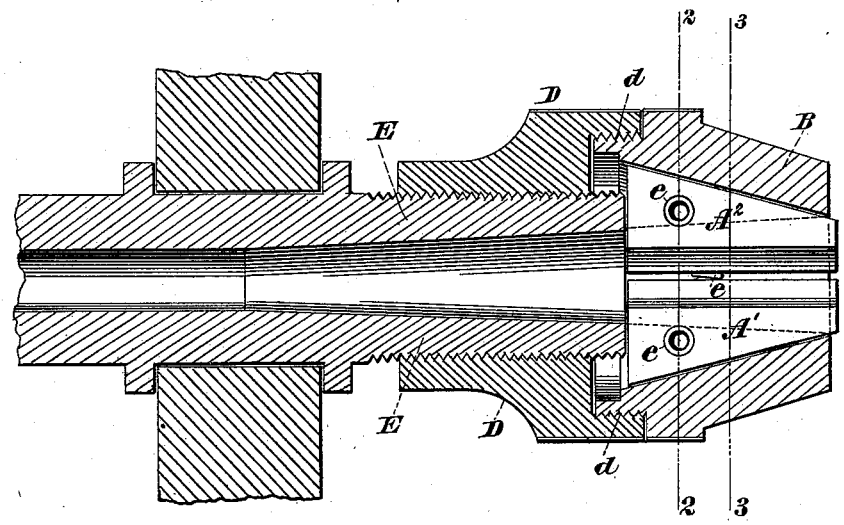
Figure 2:
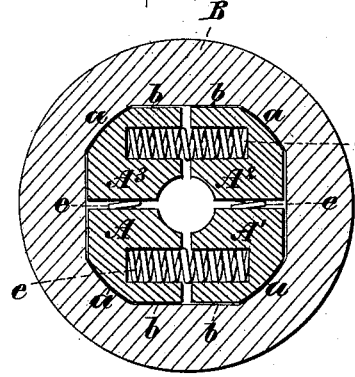
Figure 4:
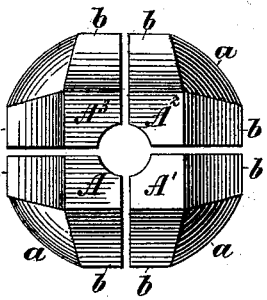
Figure 3:
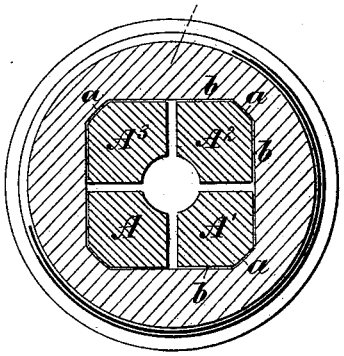
Figure 5:
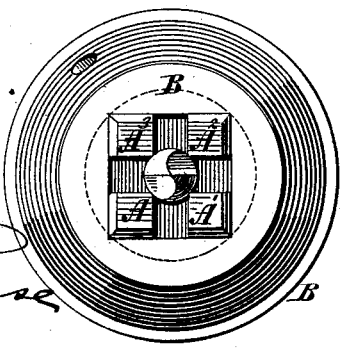

In the accompanying drawings, Figure 1 is a central longitudinal section of my improved chuck. Fig. 2 is a transverse section on the line 2 2, Fig. 1. Fig. 3 is a transverse section on the line 3 3, Fig. 1. Fig. 4 is an end view of the jaws which are represented in Figs. 1, 2, and 3, looking at them from their smaller end. Fig. 5 is an end view of the chuck, the jaws here shown being of modified form as compared with those shown in Fig. 4. Fig. 6 is an elevation of the jaws removed from the contractor-shell, showing their form and the intervening spring. Fig. 7 is a detached end view of the jaws and springs as represented in Fig. 5. Fig. 8 is a central longitudinal section of the contractor-shell. Fig. 9 is a diagrammatical rear end view of the chuck, showing the principles upon which the same is built; and Fig. 10 is a perspective view of the pyramidal body formed by the jaws when their angles are not sloped away, as hereinafter described.

The theory of the invention will best be understood by referring to Figs. 9 and 10, which represent four jaws, forming together a truncated pyramid and embraced by a hollow shell B, whose inner walls conform to the outer faces of said pyramid. The inner pyramid, which may be a three or more sided pyramid, is cut into the proper number of jaws, one jaw being formed by preference for every angle of which the base of the pyramid is composed. Thus if A, A', A², and A³ are the four jaws which are formed of this pyramid by cutting the same twice longitudinally B is the contractor-shell embracing the same. It will be observed from these figures just named that the angles of the jaws correspond to the angles of the shell and that therefore each jaw from one end to the other finds a complete guidance in the corresponding angle of the shell. It is not essential that the angles of the pyramid be pronounced in the manner indicated in the above-mentioned Figs. 9 and 10, because considerable material can be saved by cutting or beveling away the corners of the pyramid, as indicated by dotted lines $a$ in Fig. 9, the result of such removal of the extreme corners being a smaller external diameter of the contractor-shell and a corresponding saving of material and of size of shell, so that it shall be more convenient to handle; but whether these angles or corners are cut away or beveled or not each jaw, and therefore also the shell, still retains a portion $b$ of each of its original (or theoretically original) pyramidal faces, which are the actuating-faces for guiding and moving the jaws, the said faces $b$ now referred to being those of the jaws as well as of the contractor-shell.

In practice the structure might be built up somewhat in the following manner, and this I mention in order to make the invention perfectly clear: First build a pyramid-like block from which the jaws are to be made, slope away the extreme angles or corners $a$, so, however, as to leave sufficient of each side $b$ of the pyramid for each jaw, then cut through the block, as shown in Fig. 10, longitudinally to form the proper number of jaws, and then cast around this pyramidal block (this of course may perhaps best be done before cutting the said block into jaws) the outer or contractor shell B, whose inner faces will thereupon of course correspond exactly to the outer faces of the central block. Nothing more need now be done to complete my chuck but to provide the outer shell B with suitable means for moving it, thereby contracting or expanding the jaws. Such means may be, as shown in Fig. 1, the application of a screwthread $d$ to some external portion of the shell B for engaging with an annular body D, which in turn can be screwed upon a supporting threaded spindle or tube E, the spindle being hollow if the tool is to be used on long rods that are to pass into or through the spindle, while it may be solid if the tool is to be used as an ordinary chuck merely to hold drills or the like, Fig. 5. The outer end of the spindle, as shown in Fig. 1, forms the resting-place for the larger ends of the jaws. All that is necessary to do with this tool thus ideally constructed is to insert the thing to be gripped between the jaws while they are in their expanded condition and thereupon turn the shell B or its supporting-body D, so as to advance the same, thereby necessarily crowding the jaws closer toward one another and causing the thing to be held to be gripped. It is not necessary that there should be automatic expansion of the jaws in this tool, although for many purposes it is quite desirable. Such automatic expansion can be obtained by the employment of spiral springs $e\ e$, which are inserted between the jaws, as shown in Figs. 2, 6, and 7, the ends of said springs entering chambers drilled into the faces of the jaws, said springs and their receiving-chambers being so constituted and proportioned as to allow the jaws to be forced into close proximity to one another. When the external pressure upon the jaws relaxes upon the inward motion of the contractor-shell, these springs will expand. They always hold the jaws in close contact with the walls of the contractor-shell.

What I claim, and desire to secure by Letters Patent, is—

1. In a chuck, the combination of the contractor-shell B having internal sloping contact-faces $b\ b$ that stand at angles to one another, with the jaws A A' &c. having external contact-faces $b\ b$ that stand at the like angle to one another and that correspond and contact with the faces in the said shell, two of the faces of each jaw being in contact with two faces of the shell, and with means substantially as described for moving the jaws longitudinally, as specified.

2. In a chuck, the combination of the contractor-shell B having internal contact-faces $b\ b$ that stand at angles to one another, and a bevel-like connection $a$ between said contact-faces, with the jaws A A' &c. having external contact-faces $b\ b$, and an external bevel-like connection between said faces, the contact-faces and bevel-like connection of said jaws corresponding and contacting in the rearmost position of the jaws with the contact-faces and bevel-like connection of the shell, all arranged so that two contact-faces $b\ b$ of each jaw shall meet two contact-faces $b\ b$ of the shell, and means substantially as described for moving the jaws longitudinally, as specified.

3. A chuck composed of a longitudinally-movable shell B, and means for moving it longitudinally, of a suitable spindle E carrying said shell, and of tapering angular jaws A A' &c. resting against said spindle and contained within said shell, the said jaws and the inner faces of said shell forming angular contact-faces $b\ b$ and bevel connections $a$, as and for the purpose specified.

4. The combination in a chuck of a contractor-shell B having inner tapering flat contact-faces $b\ b$, with the jaws A A' &c. having corresponding outer flat contact-faces $b\ b$ and with spiral springs $e\ e$ interposed between said jaws and socketed therein, and with means substantially as described for moving the jaws longitudinally, as and for the purpose specified.

THOMAS R. ALMOND.

Witnesses:
GEO. E. MORSE,
MAURICE BLOCK.